United States Patent
Lee et al.

(10) Patent No.: US 12,519,161 B2
(45) Date of Patent: Jan. 6, 2026

(54) RECHARGEABLE BATTERY

(71) Applicant: SK On Co., Ltd., Seoul (KR)

(72) Inventors: Seung Hun Lee, Daejeon (KR); Hyun Yub Lim, Daejeon (KR); So Eun Kim, Daejeon (KR); Ha Nee Kim, Daejeon (KR); Yong Bok Moon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 612 days.

(21) Appl. No.: 17/960,461

(22) Filed: Oct. 5, 2022

(65) Prior Publication Data

US 2023/0106265 A1    Apr. 6, 2023

(30) Foreign Application Priority Data

Oct. 6, 2021    (KR) .................... 10-2021-0132352

(51) Int. Cl.
*H01M 50/00* (2021.01)
*H01M 50/15* (2021.01)
*H01M 50/533* (2021.01)
*H01M 50/534* (2021.01)

(52) U.S. Cl.
CPC ......... *H01M 50/15* (2021.01); *H01M 50/533* (2021.01); *H01M 50/534* (2021.01)

(58) Field of Classification Search
CPC ... H01M 50/15; H01M 50/533; H01M 50/537
See application file for complete search history.

(56) References Cited

U.S. PATENT DOCUMENTS

| | | |
|---|---|---|
| 2015/0024262 A1 | 1/2015 | Hwang |
| 2015/0180008 A1 | 6/2015 | Lee et al. |
| 2015/0340733 A1 | 11/2015 | Kwon et al. |
| 2016/0099444 A1 | 4/2016 | Park et al. |
| 2016/0351940 A1 | 12/2016 | Guen |
| 2017/0092925 A1* | 3/2017 | Shiu .................. H01M 10/0431 |
| 2019/0067663 A1* | 2/2019 | Li ........................ H01M 50/553 |
| 2019/0260086 A1 | 8/2019 | Nakashima |

FOREIGN PATENT DOCUMENTS

| | | |
|---|---|---|
| JP | H07-272986 A | 10/1995 |
| JP | 2019-145262 A | 8/2019 |
| KR | 10-2015-0009877 A | 1/2015 |
| KR | 10-2015-0073738 A | 7/2015 |
| KR | 10-1596269 B1 | 2/2016 |
| KR | 10-2016-0042244 A | 4/2016 |
| KR | 10-2019-0140263 A | 12/2019 |

(Continued)

OTHER PUBLICATIONS

GUEN et at, Rechargeable Battery, Dec. 2019, See the Sbstract. (Year: 2019).*

(Continued)

*Primary Examiner* — Tiffany Legette
*Assistant Examiner* — Monique M Wills
(74) *Attorney, Agent, or Firm* — IP & T GROUP LLP (57) ABSTRACT

A rechargeable battery includes a case having an internal space having one end thereof open, an electrode assembly disposed in the internal space of the case, and a cap plate coupled to the open case, wherein the electrode assembly has a concave-convex shape in a portion corresponding to the open end when a large surface thereof is viewed.

13 Claims, 4 Drawing Sheets

(56) References Cited

FOREIGN PATENT DOCUMENTS

KR 20190139595 A * 12/2019 ............ H01M 2/348
KR 10-2020-0097139 A 8/2020

OTHER PUBLICATIONS

Extended European Search Report for the European Patent Application No. 22199913.9 issued by the European Patent Office on Feb. 10, 2023.
Office Action for Korean Patent Application No. 10-2021-0132352 issued by the Korean Patent Office on Dec. 13, 2024.

* cited by examiner

RECHARGEABLE BATTERY

CROSS-REFERENCE TO RELATED APPLICATION(S)

This application claims benefit of priority to Korean Patent Application No. 10-2021-0132352 filed on Oct. 6, 2021 in the Korean Intellectual Property Office, the disclosure of which is incorporated herein by reference in its entirety.

BACKGROUND

1. Field

The present disclosure relates to a rechargeable battery.

2. Description of Related Art

Recently, prismatic lithium-ion batteries (rechargeable batteries) have been used in electric vehicles and energy storage systems (ESSs). Meanwhile, it is important to increase the size of an electrode assembly, in particular, an electrode plate, accommodated in a prismatic case provided in prismatic rechargeable batteries to improve energy efficiency.

To this end, an electrode assembly is configured by arranging rectangular electrode plates to overlap. However, a space for bonding the electrode assembly and a terminal portion of a cap plate is required in a prismatic case, and due to such space, inefficient space is inevitably formed in the case.

As a result, there is a problem in that energy density in the prismatic case provided in a prismatic rechargeable battery is lowered.

SUMMARY

Exemplary embodiments provide a rechargeable battery in which energy density in a prismatic case is improved.

According to an aspect of the present disclosure, a rechargeable battery includes: a case having an internal space having one end thereof open; an electrode assembly disposed in the internal space of the case; and a cap plate coupled to the open case, wherein the electrode assembly has a concave-convex shape in a portion corresponding to the open end when viewed from a wide surface.

The concave-convex shape may be a shape in which a central portion of the electrode assembly is convex.

The electrode assembly may include a first electrode plate, a separator, and a second electrode plate, and the first electrode plate, the separator, and the second electrode plate may be laminated in a width direction of the case.

A first electrode lead connected to the first electrode plate may be disposed on one side of the electrode assembly, and a second electrode lead connected to the second electrode plate may be disposed on the other side of the electrode assembly.

The cap plate may include a first terminal portion electrically connected to the first electrode plate and a second terminal portion spaced apart from the first terminal portion and electrically connected to the second electrode plate, the first terminal portion and the first electrode lead may be connected by a first lead tab, and the second terminal portion and the second electrode lead may be connected by a second lead tab.

The first and second lead tabs may have a bent shape.

The first and second lead tabs may include an insulating layer formed of a material different to that of the case, and the insulating layer may be provided on one surface of the first and second lead tabs disposed to face the inner surface of the case.

An insulating film may be disposed between the cap plate and the electrode assembly in a region excluding a region in which the first and second terminal portions are disposed.

The concave-convex shape may be a shape in which a central portion of the electrode assembly is concave.

The cap plate may include a first terminal portion electrically connected to the first electrode plate and a second terminal portion spaced apart from the first terminal portion and electrically connected to the second electrode plate, and the first and second terminal portions may be disposed in a central portion of the cap plate.

The first terminal portion and the first electrode lead may be connected by a first lead tab, the second terminal portion and the second electrode lead may be connected by a second lead tab, and the first and second terminal portions and the first and second lead tabs may be connected to each other in a central portion of the cap plate.

According to another aspect of the present disclosure, a rechargeable battery includes: a case having an internal space having one end thereof open; an electrode assembly disposed in the internal space of the case and including a first electrode plate, a separator, and a second electrode plate; and a cap plate coupled to the open end portion and having a first terminal portion electrically connected to the first electrode plate and a second terminal portion electrically connected to the second electrode plate, wherein the electrode assembly has a convex shape to be disposed between the first and second terminal portions or to be disposed outside the first and second terminal portions, in a portion corresponding to the open end portion when viewed from a wide surface.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Exemplary embodiments of the present disclosure will now be described in detail with reference to the accompanying drawings. However, various changes in form and details may be made within the scope of the present disclosure, and the scope of the present disclosure is not limited to the exemplary embodiments described below. The exemplary embodiments are provided so that this disclosure will be thorough and complete, and will fully convey the scope of the invention to those of ordinary skill in the art. In the drawings, the shapes and dimensions of elements may be exaggerated for clarity.

Figure 1:
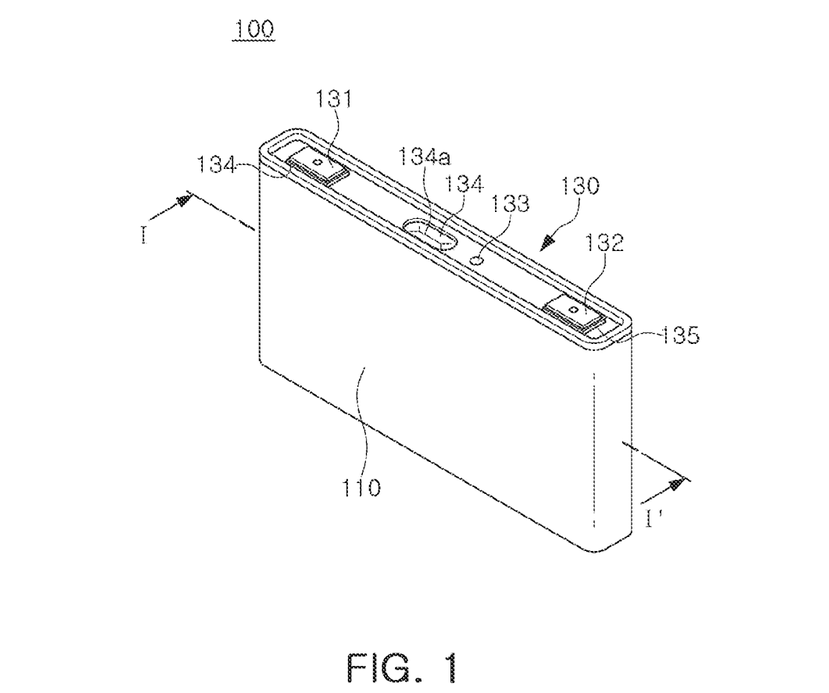
FIG. 1 is a perspective view illustrating a rechargeable battery according to an exemplary embodiment of the present disclosure.
Figure 2:
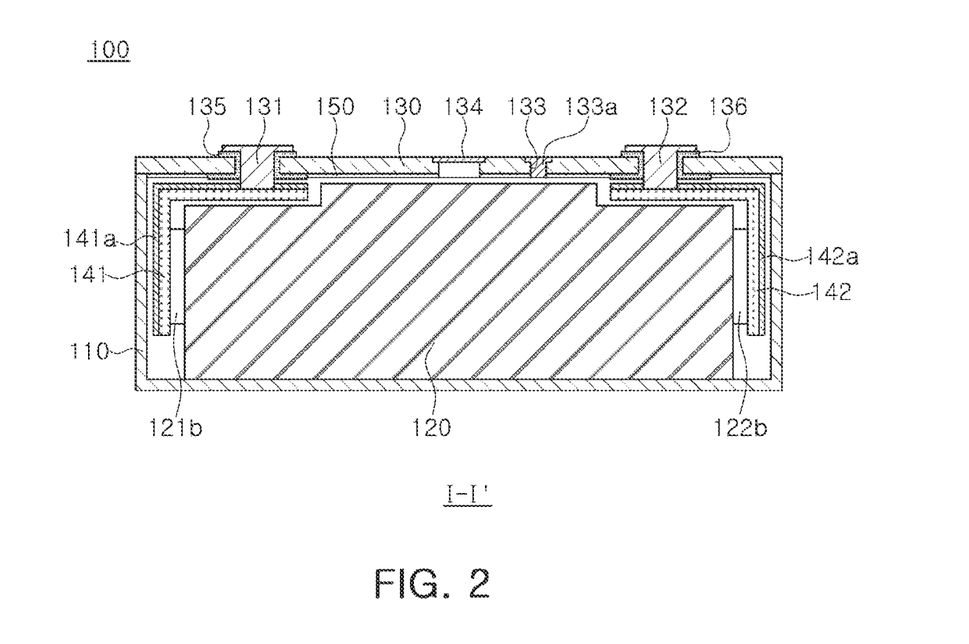
FIG. 2 is a cross-sectional view illustrating a rechargeable battery according to an exemplary embodiment of the present disclosure.
Figure 3:
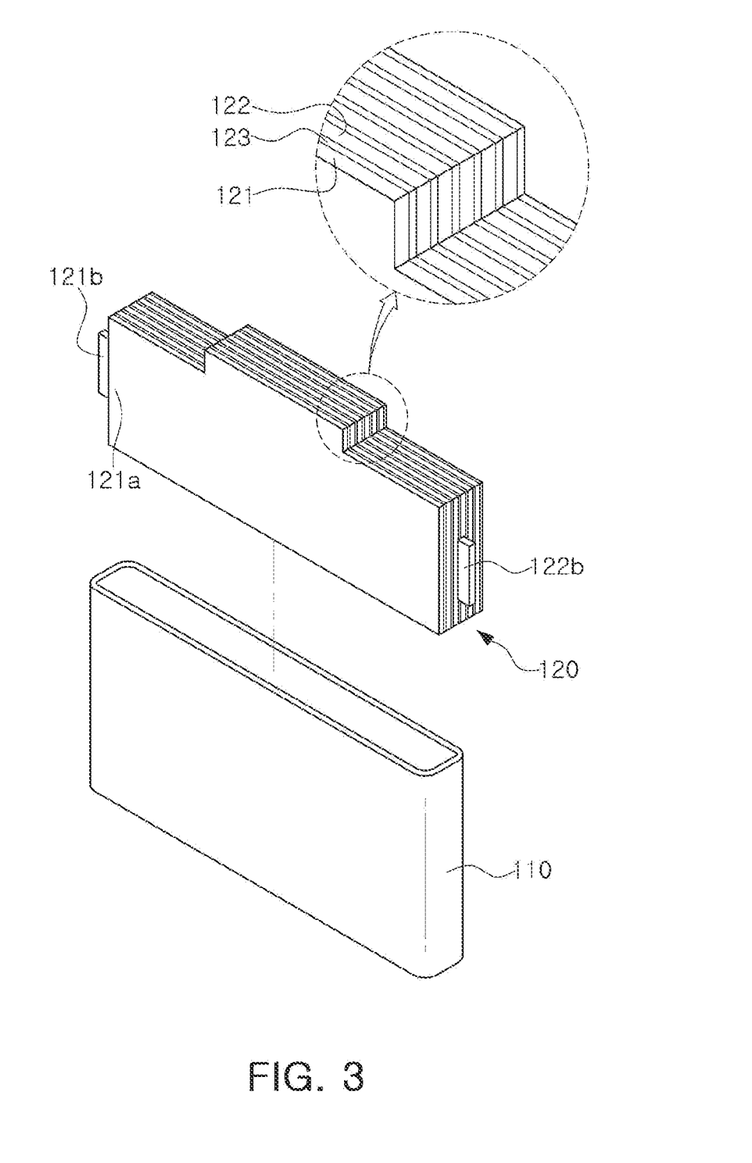
FIG. 3 is a perspective view illustrating an electrode assembly of a rechargeable battery according to an exemplary embodiment of the present disclosure.

FIG. 1 is a perspective view illustrating a rechargeable battery according to an exemplary embodiment of the present disclosure, FIG. 2 is a cross-sectional view illustrating a rechargeable battery according to an exemplary embodiment of the present disclosure, and FIG. 3 is a perspective view illustrating an electrode assembly of a rechargeable battery according to an exemplary embodiment of the present disclosure.

Referring to FIGS. 1 to 3, a rechargeable battery 100 according to an exemplary embodiment of the present disclosure may include, as an example, a case 110, an electrode assembly 120, and a cap plate 130.

The case 110 forms an internal space accommodating the electrode assembly 120 and an electrolyte therein. As an example, the case 110 may have a rectangular parallelepiped shape with an upper portion open. As described above, since the upper portion of the case 110 is open, the electrode assembly 120 may be inserted into the inside through the open upper portion of the case 110. As an example, the case 110 may be formed of a metal such as aluminum or stainless steel.

The electrode assembly 120 is disposed in the internal space of the case 110. The electrode assembly 120 includes a first electrode plate 121, a second electrode plate 122, and a separator 123 formed in a thin plate or film shape, and may be formed in various forms as needed, such as a laminated type or a wound type. As an example, the first electrode plate 121 may serve as a negative electrode, and the second electrode plate 122 may serve as a positive electrode.

The first electrode plate 121 may be formed by applying a first electrode active material such as graphite or carbon to a first electrode current collector formed of, for example, metal foil such as copper, a copper alloy, nickel, or a nickel alloy. In addition, the first electrode plate 121 includes a first electrode uncoated portion 121a that is a region to which the first electrode active material is not applied. The first electrode uncoated portion 121a serves as a path for current flow between the first electrode plate 121 and the outside of the first electrode plate 121. Meanwhile, the first electrode plate 121 may include a first electrode lead 121b connected to the first electrode uncoated portion 121a. As an example, the first electrode lead 121b may be bonded to and installed on the first electrode uncoated portion 121a by welding. Also, the first electrode lead 121b may be formed of copper or a copper alloy. As an example, the first electrode lead 121b is may be disposed on one side of the electrode assembly 120.

The second electrode plate 122 may be formed by, for example, applying a second electrode active material such as a transition metal oxide on a second electrode current collector formed of metal foil such as aluminum or an aluminum alloy. In addition, the second electrode plate 122 includes a second electrode uncoated portion (not shown) that as a region in which the second electrode active material is not applied. The second electrode uncoated portion also serves as a passage for current flow between the second electrode plate 122 and the outside of the second electrode plate 122. Meanwhile, the second electrode plate 122 may include a second electrode lead 122b connected to the second electrode uncoated portion. As an example, the second electrode lead 122b may be bonded to and installed on the second electrode uncoated portion by welding. In addition, the second electrode lead 122b may be formed of aluminum or an aluminum alloy. As an example, the second electrode lead 122b is disposed on the other side of the electrode assembly 120.

The separator 123 is positioned between the first electrode plate 121 and the second electrode plate 122 to prevent a short circuit and serves to enable movement of lithium ions. For example, the separator 123 may be formed of polyethylene, polypropylene, or a composite film of polyethylene and polypropylene. As an example, the separator 123 may be disposed between the first and second electrode plates 121 and 122 one by one, and as each separator 123 is alternately folded at one side and at the other side, each separator 123 may be insertedly disposed between the plurality of first and second electrode plates 121 and 122. In other words, the separator 123 may be formed of a plurality of separators or may be formed of a single separator 123. However, the present disclosure is not limited thereto, and the separator 123 may be variously modified if it is disposed between the first and second electrode plates 121 and 122 to prevent a short circuit and enable movement of lithium ions.

Meanwhile, the first electrode plate 121, the second electrode 122, and the separator 123 may be arranged in a width direction (a Y-axis direction of FIG. 1) of the case 110. Accordingly, the volume occupied by the electrode assembly 120 in the case 110 may be increased, so that energy efficiency may be improved. In addition, as the first electrode plate 121, the second electrode 122, and the separator 123 are arranged in the width direction (the Y-axis direction in FIG. 1) of the case 110, the first and second electrode leads 121b and 122b are disposed at both ends of the electrode assembly 120. Accordingly, space efficiency may be further improved, and the manufacturing yield may be improved by reducing the number of laminated first and second electrode plates 121 and 122, while increasing the size of the laminated first and second electrode plates 121 and 122. Here, referring to terms for directions, a length direction is defined as the X-axis direction of FIG. 1 and a height direction is defined as the Z-axis direction of FIG. 1.

In other words, the electrode assembly 120 is formed so that the length in the length direction is greater than the length in the width direction and the length in the height direction.

Meanwhile, when the electrode assembly 120 is viewed from the front, that is, when the largest portion of the electrode assembly 120 is viewed, the electrode assembly 120 has a concave-convex shape at an upper end thereof. For example, as for the concave-convex shape, a central portion of the electrode assembly 120 may have a convex shape. In addition, the concave-convex shape in which the central portion is convex may have a rectangular shape when viewed from the front.

Accordingly, the energy density of the rechargeable battery 100 may be improved by increasing the size of the electrode assembly 120. In other words, the size of the electrode assembly 120 may be increased, while an empty space inside the case 110 is reduced.

However, the concave-convex shape is not limited to the rectangular shape, and the concave-convex shape may be variously changed.

Meanwhile, the separator 123 may have a shape corresponding to the shape of the electrode assembly 120, and may have a rectangular shape having a size sufficient to cover the concave-convex portion having a convex shape in the electrode assembly 120. When the separator 123 has a rectangular shape, an upper edge of the separator 123 disposed outside the convex-concave portion having a convex shape may be pressed by first and second terminal portions and 132 to be described later.

Meanwhile, the electrode assembly 120 is accommodated in the case 110 together with an electrolyte. The electrolyte may be formed of a lithium salt such as $LiPF_6$ or $LiBF_4$ in an organic solvent such as ethylene carbonate (EC), propylene carbonate (PC), diethyl carbonate (DEC), ethylmethyl carbonate (EMC), or dimethyl carbonate (DMC). In addition, the electrolyte may be in a liquid or gel form.

The cap plate 130 is coupled to the upper end of the case 110 to seal the case 110. For example, the case 110 and the cap plate 130 may be formed of aluminum and welded to each other. Meanwhile, the cap plate 130 includes a first terminal portion 131 electrically connected to the first electrode plate 121 and a second terminal portion 132 electrically connected to the second electrode plate 122. Also, in the cap plate 130, an electrolyte injection port 133 and a vent hole 134 may be disposed between the first and second terminal portions 333 and 132. The electrolyte injection port 133 serves to inject an electrolyte into the case 110 after the cap plate 130 is coupled to the case 110. The electrolyte injection port 133 is sealed by a sealing stopper 133a after the injection of the electrolyte.

The vent hole 134 is sealed with a vent plate 134a to discharge internal pressure of the rechargeable battery 110. When the internal pressure of the rechargeable battery 110 reaches a set pressure, the vent plate 134a is cut to open the vent hole 134. As an example, the vent plate 134a may include a notch 134a-1 for inducing cutting.

The first and second terminal portions 131 and 132 may be respectively installed in the terminal holes of the cap plate 130. Meanwhile, first and second gaskets 135 and 136 are disposed between the first and second terminal portions 131 and 132 and the terminal hole to seal and electrically insulate the first and second terminal portions 131 and 132 and the cap plate 130.

In addition, in the cap plate 130, the first and second gaskets 135 and 136 are installed at the first terminal portions 131 and 132 to prevent the electrolyte from leaking through the terminal hole.

The first and second lead tabs 141 and 142 electrically connect the first and second terminal portions 131 and 132 to the first and second electrode plates 121 and 122 of the electrode assembly 120, respectively. That is, the first and second lead tabs 141 and 142 may be bonded to the first and second terminal portions 131 and 132 by welding.

Meanwhile, the first and second lead tabs 141 and 142 may include first and second insulating layers 141a and 142a for insulation from the inner surface of the case 110. Accordingly, the first and second lead tabs 141 and 142 and the case 110 may be electrically insulated.

As an example, the first and second lead tabs 141 and 142 may be bent to connect the first and second electrode leads 121b and 122b disposed to protrude from both sides of the electrode assembly 120 to the first and second terminal portions 131 and 132 of the cap plate 130.

Meanwhile, an insulating film 150 for insulating the electrode assembly 120 and the cap plate 130 from each other may be disposed between the electrode assembly 120 and the cap plate 130. Through-holes (not shown) through which the first and second terminal portions 131 and 132 pass may be provided in the insulating film 150.

As described above, a space for welding the first and second terminal portions 131 and 132 provided in the cap plate 130 and the first and second lead tabs 141 and 142 is formed inside the case 110. However, since the convex portion having a concave-convex shape in the electrode assembly 120 is provided to be disposed between the first and second terminal portions 131 and 132, energy density may be improved.

Figure 4:
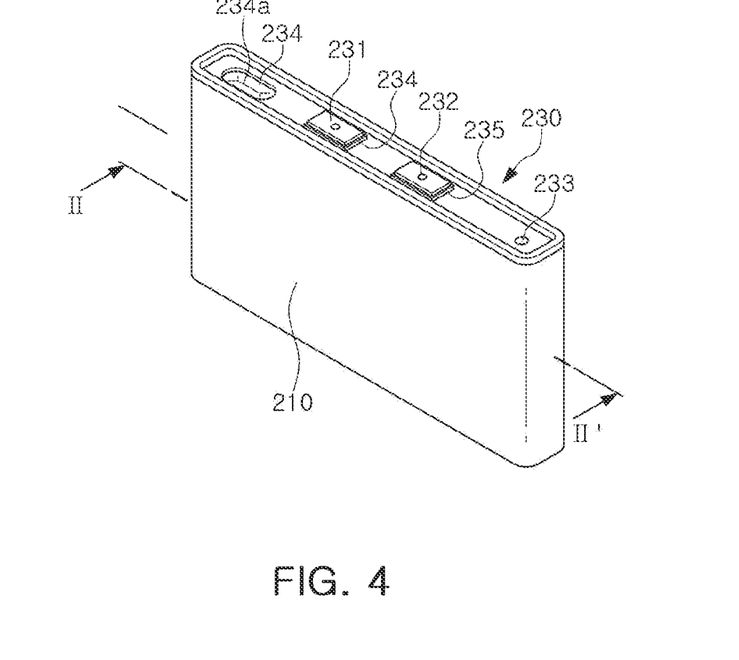
FIG. 4 is a perspective view illustrating a rechargeable battery according to an exemplary embodiment of the present disclosure.
Figure 5:
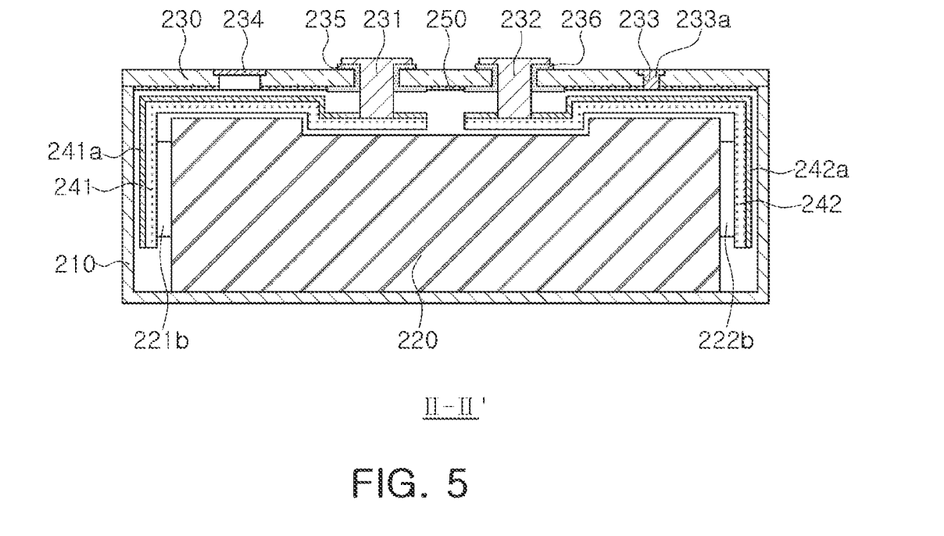
FIG. 5 is a cross-sectional view illustrating a rechargeable battery according to an exemplary embodiment of the present disclosure.
Figure 6:
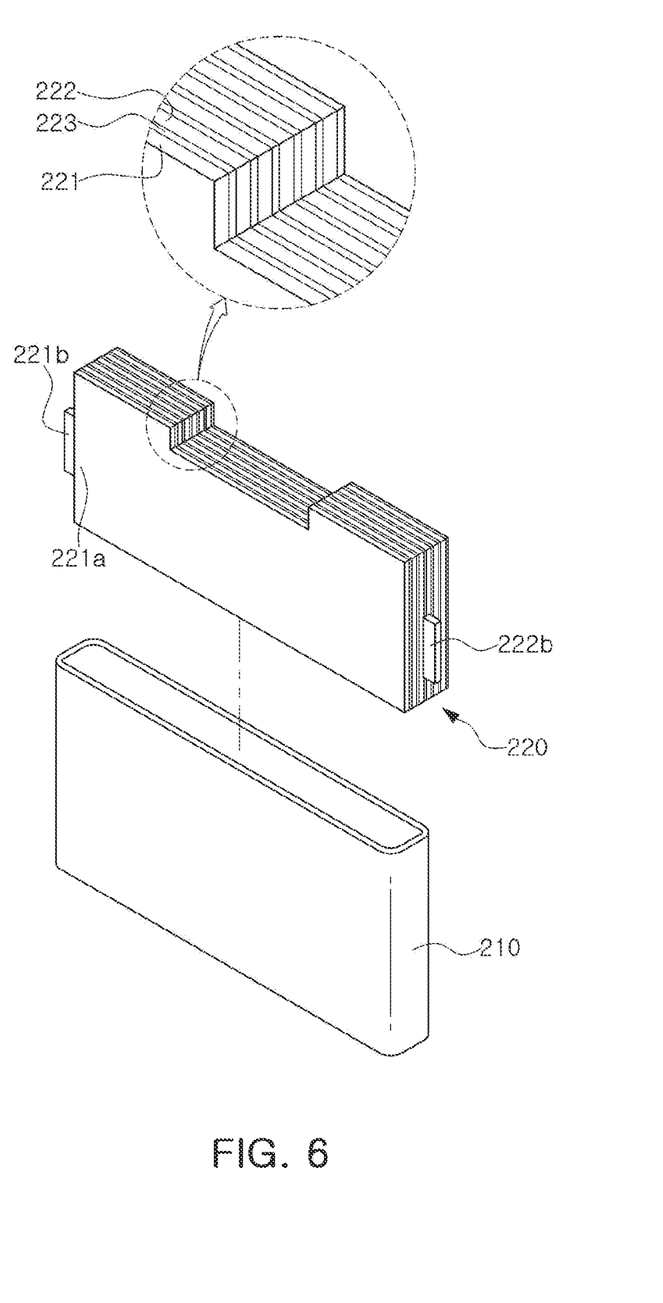
FIG. 6 is a perspective view illustrating an electrode assembly of a rechargeable battery according to an exemplary embodiment of the present disclosure.

FIG. 4 is a perspective view illustrating a rechargeable battery according to an exemplary embodiment of the present disclosure, FIG. 5 is a cross-sectional view illustrating a rechargeable battery according to an exemplary embodiment of the present disclosure, and FIG. 6 is a perspective view illustrating an electrode assembly of a rechargeable battery according to an exemplary embodiment of the present disclosure.

Referring to FIGS. 4 to 6, a rechargeable battery 200 according to an exemplary embodiment of the present disclosure may include, for example, a case 210, an electrode assembly 220, and a cap plate 230.

The case 110 forms an internal space accommodating the electrode assembly 220 and an electrolyte therein. As an example, the case 210 may have a rectangular parallelepiped shape with an upper portion open. As described above, since the upper portion of the case 210 is open, the electrode assembly 220 may be inserted into the inside through the open upper portion of the case 210. As an example, the case 210 may be formed of a metal such as aluminum or stainless steel.

The electrode assembly 220 is disposed in the internal space of the case 210. The electrode assembly 220 includes a first electrode plate 221, a second electrode plate 222, and a separator 223 formed in a thin plate or film shape, and may be formed in various forms as needed, such as a laminated type or a wound type. As an example, the first electrode plate 221 may serve as a negative electrode, and the second electrode plate 222 may serve as a positive electrode.

The first electrode plate 221 may be formed by applying a first electrode active material such as graphite or carbon to a first electrode current collector formed of, for example, metal foil such as copper, a copper alloy, nickel, or a nickel alloy. In addition, the first electrode plate 221 includes a first electrode uncoated portion 221a that is a region in which the first electrode active material is not applied. The first electrode uncoated portion 221a serves as a path for current flow between the first electrode plate 221 and the outside of the first electrode plate 221. Meanwhile, the first electrode plate 221 may include a first electrode lead 221b connected to the first electrode uncoated portion 221a. As an example, the first electrode lead 221b may be bonded to and installed on the first electrode uncoated portion 221a by welding. Also, the first electrode lead 221b may be formed of copper or a copper alloy. As an example, the first electrode lead 221b is may be on one side of the electrode assembly 220.

The second electrode plate 222 may be formed by, for example, applying a second electrode active material such as a transition metal oxide on a second electrode current collector formed of metal foil such as aluminum or an aluminum alloy. In addition, the second electrode plate 222 includes a second electrode uncoated portion (not shown) that is a region in which the second electrode active material is not applied. The second electrode uncoated portion also serves as a passage for current flow between the second electrode plate 222 and the outside of the second electrode plate 222. Meanwhile, the second electrode plate 222 may include a second electrode lead 222b connected to the second electrode uncoated portion. As an example, the second electrode lead 222b may be bonded to and installed on the second electrode uncoated portion by welding. In addition, the second electrode lead 222b may be formed of aluminum or an aluminum alloy. As an example, the second electrode lead 222b is disposed on the other side of the electrode assembly 220.

The separator 223 is positioned between the first electrode plate 221 and the second electrode plate 222 to prevent a short circuit and serves to enable movement of lithium ions. For example, the separator 223 may be formed of polyethylene, polypropylene, or a composite film of polyethylene and polypropylene. As an example, the separator 223 may be disposed between the first and second electrode plates 221 and 222 one by one, and as each separator 223 is alternately folded at one side and at the other side, each separator 223 may be insertedly disposed between the plurality of first and second electrode plates 221 and 222. In other words, the separator 223 may be formed of a plurality of separators or may be formed of a single separator 223. However, the present disclosure is not limited thereto, and the separator 223 may be variously modified if it is disposed between the first and second electrode plates 221 and 222 to prevent a short circuit and enable movement of lithium ions.

Meanwhile, the first electrode plate 221, the second electrode 222, and the separator 223 may be arranged in a width direction (a Y-axis direction of FIG. 1) of the case 210. Accordingly, the volume occupied by the electrode assembly 220 in the case 210 may be increased, so that energy efficiency may be improved. In addition, as the first electrode plate 221, the second electrode 222, and the separator 223 are arranged in the width direction (the Y-axis direction in FIG. 1) of the case 210, the first and second electrode leads 221b and 222b are disposed at both ends of the electrode assembly 220. Accordingly, space efficiency may be further improved, and the manufacturing yield may be improved by reducing the number of laminated first and second electrode plates 221 and 222, while increasing the size of the laminated first and second electrode plates 221 and 222. Here, referring to terms for directions, a length direction is defined as the X-axis direction of FIG. 1 and a height direction is defined as the Z-axis direction of FIG. 1.

In other words, the electrode assembly 220 is formed so that the length in the length direction is greater than the length in the width direction and the length in the height direction.

Meanwhile, when the electrode assembly 220 is viewed from the front, that is, when the largest portion of the electrode assembly 220 is viewed, the electrode assembly 220 has a concave-convex shape at an upper end thereof. For example, as for the concave-convex shape, a central portion of the electrode assembly 220 may have a concave shape. In addition, the concave-convex shape in which the central portion is concave may have a rectangular shape when viewed from the front.

Accordingly, the energy density of the rechargeable battery 200 may be improved by increasing the size of the electrode assembly 220. In other words, the size of the electrode assembly 220 may be increased, while an empty space inside the case 210 is reduced.

However, the concave-convex shape is not limited to the rectangular shape, and the concave-convex shape may be variously changed.

Meanwhile, the separator 223 may have shape corresponding to the shape of the electrode assembly 220, and may have a rectangular shape having a size sufficient to cover the concave-convex portion having a concave shape in the electrode assembly 220. When the separator 223 has a rectangular shape, an upper edge of the separator 223 disposed inside the convex-concave portion having a concave shape may be pressed by first and second terminal portions 231 and 232 to be described later.

Meanwhile, the electrode assembly 220 is accommodated in the case 210 together with an electrolyte. The electrolyte may be formed of a lithium salt such as $LiPF_6$ or $LiBF_4$ in an organic solvent such as ethylene carbonate (EC), propylene carbonate (PC), diethyl carbonate (DEC), ethylmethyl carbonate (EMC), or dimethyl carbonate (DMC). In addition, the electrolyte may be in a liquid or gel form.

The cap plate 230 is coupled to the upper end of the case 210 to seal the case 210. For example, the case 210 and the cap plate 230 may be formed of aluminum and welded to each other. Meanwhile, the cap plate 230 includes a first terminal portion 231 electrically connected to the first electrode plate 221 and a second terminal portion 232 electrically connected to the second electrode plate 222. Also, in the cap plate 230, an electrolyte injection port 233 and a vent hole 234 may be disposed between the first and second terminal portions 231 and 232. The electrolyte injection port 233 serves to inject an electrolyte into the case 210 after the cap plate 230 is coupled to the case 210. The electrolyte injection port 233 is sealed by a sealing stopper 233a after the injection of the electrolyte.

The vent hole 234 is sealed with a vent plate 234a to discharge internal pressure of the rechargeable battery 210. When the internal pressure of the rechargeable battery 210 reaches a set pressure, the vent plate 234a is cut to open the vent hole 234. As an example, the vent plate 234a may include a notch 234a-1 for inducing cutting.

The first and second terminal portions 231 and 232 may be respectively installed in the terminal holes 233 of the cap plate 230. Meanwhile, first and second gaskets 235 and 236 are disposed between the first and second terminal portions 231 and 232 and the terminal hole to seal and electrically insulate the first and second terminal portions 231 and 232 and the cap plate 230.

In addition, in the cap plate 230, the first and second gaskets 235 and 236 are installed in the first terminal portions 231 and 232 to prevent the electrolyte from leaking through the terminal hole.

The first and second lead tabs 241 and 242 electrically connect the first and second terminal portions 231 and 232 to the first and second electrode plates 221 and 222 of the electrode assembly 220, respectively. That is, the first and second lead tabs 241 and 242 may be bonded to the first and second terminal portions 231 and 232 by welding.

Meanwhile, the first and second lead tabs 241 and 242 may include first and second insulating layers 241a and 242a for insulation from the inner surface of the case 210. Accordingly, the first and second lead tabs 241 and 242 and the case 210 may be electrically insulated.

As an example, the first and second lead tabs 241 and 242 may be bent to connect the first and second electrode leads 221b and 222b disposed to protrude from both sides of the electrode assembly 220 to the first and second terminal portions 231 and 232 of the cap plate 230.

Meanwhile, an insulating film 250 for insulating the electrode assembly 220 and the cap plate 230 from each other may be disposed between the electrode assembly 220 and the cap plate 230. Through-holes (not shown) through which the first and second terminal portions 231 and 232 pass may be provided in the insulating film 250.

As described above, a space for welding the first and second terminal portions 231 and 232 provided in the cap plate 230 and the first and second lead tabs 241 and 242 is formed inside the case 210. However, since the concave portion having a concave-convex shape in the electrode assembly 220 is provided to be disposed between the first and second terminal portions 231 and 232, energy density may be improved.

The present disclosure has the effect of improving the energy density in the prismatic case.

While example exemplary embodiments have been shown and described above, it will be apparent to those skilled in the art that modifications and variations could be made without departing from the scope of the present disclosure as defined by the appended claims.

What is claimed is:

1. A rechargeable battery comprising:
    a case having an internal space having one end thereof open;
    an electrode assembly disposed in the internal space of the case; and
    a cap plate coupled to the open end of the case,
    wherein the electrode assembly has a concave-convex shape in a portion corresponding to the open end when a large surface thereof is viewed,
    wherein the portion corresponding to the open end is an upper end of the electrode assembly,
    wherein the electrode assembly includes a first electrode plate and a second electrode plate,
    the rechargeable battery further comprising:
    a first electrode lead connected to the first electrode plate and disposed on a first side of the electrode assembly below the upper end having the concave-convex shape, and
    a second electrode lead connected to the second electrode plate and disposed on a second side of the electrode assembly below the upper end having the concave-convex shape and opposite the first side.

2. The rechargeable battery of claim 1, wherein the concave-convex shape is a shape in which a central portion of the electrode assembly is convex.

3. The rechargeable battery of claim 2, wherein the electrode assembly further includes a separator, and the first electrode plate, the separator, and the second electrode plate are arranged in a width direction of the case.

4. The rechargeable battery of claim 1, wherein
    the cap plate includes a first terminal portion electrically connected to the first electrode plate and a second terminal portion spaced apart from the first terminal portion and electrically connected to the second electrode plate,
    the first terminal portion and the first electrode lead are connected by a first lead tab, and
    the second terminal portion and the second electrode lead are connected by a second lead tab.

5. The rechargeable battery of claim 4, wherein the first and second lead tabs have a bent shape.

6. The rechargeable battery of claim 4, wherein
    the first and second lead tabs include an insulating layer formed of a material different to that of the case, and
    the insulating layer is provided on one surface of the first and second lead tabs disposed to face the inner surface of the case.

7. The rechargeable battery of claim 4, wherein an insulating film is disposed between the cap plate and the electrode assembly in a region excluding a region in which the first and second terminal portions are disposed.

8. The rechargeable battery of claim 1, wherein the concave-convex shape is a shape in which a central portion of the electrode assembly is concave.

9. The rechargeable battery of claim 8, wherein
    the cap plate includes a first terminal portion electrically connected to the first electrode plate and a second terminal portion spaced apart from the first terminal portion and electrically connected to the second electrode plate, and
    the first and second terminal portions are disposed in a central portion of the cap plate.

10. The rechargeable battery of claim 9, wherein the first terminal portion and the first electrode lead are connected by a first lead tab, the second terminal portion and the second electrode lead are connected by a second lead tab, and the first and second terminal portions and the first and second lead tabs are connected to each other in a central portion of the cap plate.

11. The rechargeable battery of claim 8, wherein an insulating film is disposed between the cap plate and the electrode assembly in a region other than a region in which the first and second terminal portions are disposed.

12. A rechargeable battery comprising:
    a case having an internal space having one end thereof open;
    an electrode assembly disposed in the internal space of the case and including a first electrode plate, a separator, and a second electrode plate; and
    a cap plate coupled to the open end of the case and having a first terminal portion electrically connected to the first electrode plate and a second terminal portion electrically connected to the second electrode plate,
    wherein the electrode assembly has a convex shape to be disposed between the first and second terminal portions or to be disposed outside the first and second terminal portions, in a portion corresponding to the open end of the case when a large surface thereof is viewed,
    wherein the portion corresponding to the open end is an upper end of the electrode assembly,
    the rechargeable battery further comprising:
    a first electrode lead connected to the first electrode plate and disposed on a first side of the electrode assembly below the upper end having the convex shape,
    a second electrode lead connected to the second electrode plate and disposed on a second side of the electrode assembly below the upper end having the convex shape and opposite the first side.

13. The rechargeable battery of claim 12, wherein the first electrode plate, the separator, and the second electrode plate are arranged in a width direction of the case.

* * * * *